FIG. 3
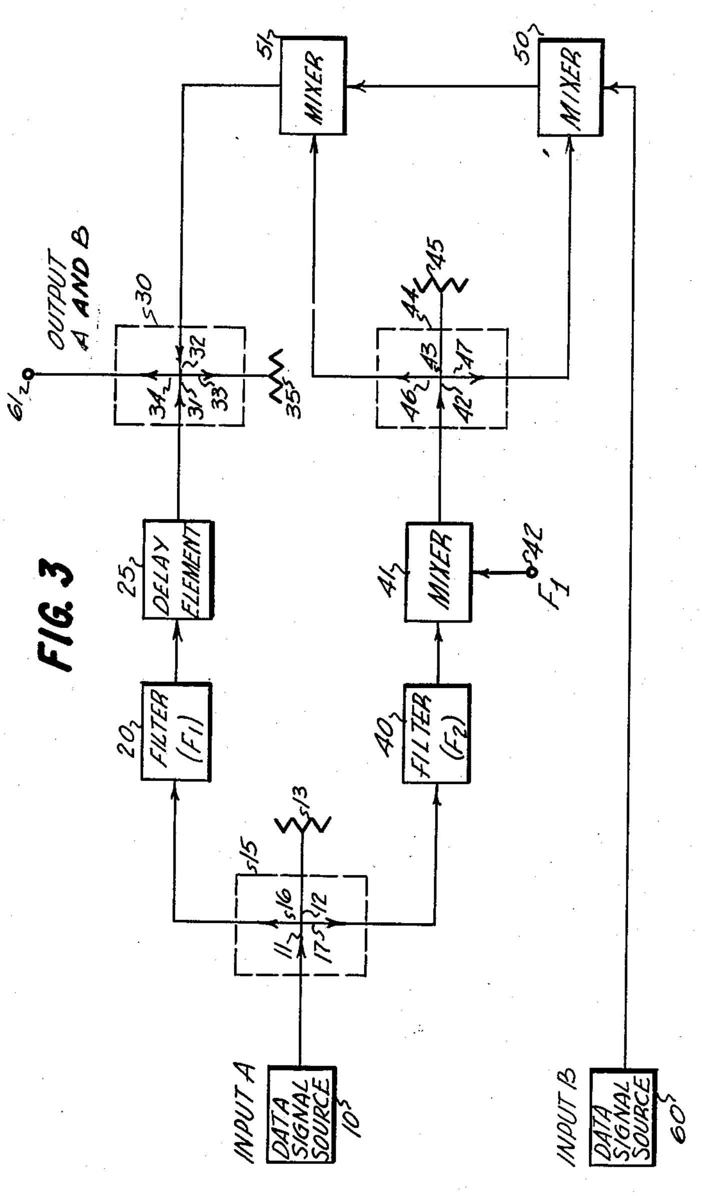
FIG. 2
| A \ B | F1 | F2 |
|---|---|---|
| F1 | F1 | F1 |
| F2 | F1 | F2 |
AND FUNCTION
| A \ B | F1 | F2 |
|---|---|---|
| F1 | F1 | F2 |
| F2 | F2 | F2 |
OR FUNCTION
FIG. 1
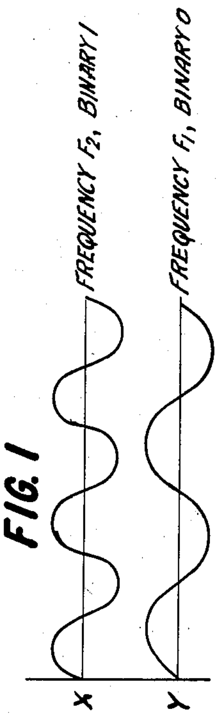
INVENTOR
MAX P. FORRER
BY
Lewis P. Elbinger
ATTORNEY INVENTOR
MAX P. FORRER
BY Lewis P. Elbinger
ATTORNEY

SIGNAL FREQUENCY IN KILOMEGACYCLES 2.8 KMC = $F_1$ = BINARY 0

6.0 KMC = $F_2$ = BINARY 1

| DATA SIGNAL A | DATA SIGNAL B | OUTPUT SIGNAL FILTER 20 | OUTPUT SIGNAL FILTER 40 | SIGNAL APPLIED TERMINAL 42 | OUTPUT SIGNAL MIXER 41 | OUTPUT SIGNAL MIXER 50 | OUTPUT SIGNAL MIXER 51 | OUTPUT SIGNAL TERMINAL 61 |
|---|---|---|---|---|---|---|---|---|
| 2.8(0) | 2.8(0) | 2.8 | - | 2.8 | - | - | - | 2.8(0) |
| 6.0(1) | 6.0(1) | - | 6.0 | 2.8 | 8.8 | 2.8 | 6.0 | 6.0(1) |
| 2.8(0) | 6.0(1) | 2.8 | - | 2.8 | - | - | - | 2.8(0) |
| 6.0(1) | 2.8(0) | - | 6.0 | 2.8 | 8.8 | 6.0 | 2.8 | 2.8(0) |

AND FUNCTION

FIG 5

SIGNAL FREQUENCY IN KILOMEGACYCLES 2.8 KMC = $F_1$ = BINARY 0

6.0 KMC = $F_2$ = BINARY 1

| DATA SIGNAL A | DATA SIGNAL B | OUTPUT SIGNAL FILTER 20 | OUTPUT SIGNAL FILTER 40 | SIGNAL APPLIED TERMINAL 42 | OUTPUT SIGNAL MIXER 41 | OUTPUT SIGNAL MIXER 50 | OUTPUT SIGNAL MIXER 51 | OUTPUT SIGNAL TERMINAL 61 |
|---|---|---|---|---|---|---|---|---|
| 2.8(0) | 2.8(0) | - | 2.8 | 6.0 | 8.8 | 6.0 | 2.8 | 2.8(0) |
| 6.0(1) | 6.0(1) | 6.0 | - | 6.0 | - | - | - | 6.0(1) |
| 2.8(0) | 6.0(1) | - | 2.8 | 6.0 | 8.8 | 2.8 | 6.0 | 6.0(1) |
| 6.0(1) | 2.8(0) | 6.0 | - | 6.0 | - | - | - | 6.0(1) |

OR FUNCTION

FIG. 6

INVENTOR
MAX P. FORRER
BY
ATTORNEY 3,077,564

BINARY LOGIC CIRCUITS UTILIZING DIVERSE FREQUENCY REPRESENTATION FOR BITS

Max P. Forrer, Palo Alto, Calif., assignor to General Electric Company, a corporation of New York Filed Feb. 9, 1961, Ser. No. 88,203
12 Claims. (Cl. 328—92)

This invention relates to logical elements, and more particularly, to logical elements operative at microwave frequencies.

In the processing of information, such as data, various logical and arithmetic operations are performed thereon. These operations are performed at relatively high speeds by the more modern data processing systems, which are primarily electronic; i.e., these systems operate on electrical signals representing data by means of electron tubes, diodes and transistors. It has been found by experience that these electronic data processing systems are most reliable when the electronic portions thereof need handle only data which is basically of binary digital form. In binary digital data processing systems, each element of information, termed a "bit," is represented by either a 1 or a 0. In the binary digital data processing systems of the prior art, it has been customary to represent these bits by the presence and absence of electrical signals at specified locations in the system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present.

Inasmuch as it is desirable to operate data processing systems at high rates of speed, these clock signals must recur at a rapid rate. This rate of recurrence is known as the "clock rate." In a typical prior art electronic data processing system, a clock rate of 100,000 clock signals per second is employed and, consequently, the data signals appearing at various utilization locations in such a system must represent 100,000 bits per second. Thus, the duration of the electrical signal representing the binary 1 must be very short (in the above example, less than 10 microseconds duration) and, hence, this signal is actually an electrical pulse. The simulation of binary digital data by the presence and absence of electrical pulses may be termed "pulse no-pulse" script.

In order to process data at increasing speeds, system clock rates must be increased. However, the maximum frequencies at which electron tube, diode, and transistor circuit elements can effectively amplify or transmit electrical signals place a serious upper limit on the clock rate of the above-mentioned prior art electronic data processing systems. The relatively narrow bandwidth for which circuit elements of these prior art systems can effectively amplify and transmit electrical signals is another serious obstacle which impedes efforts to accommodate clock rate increases and their accompanying increased bandwidths. Therefore, if it is desired to build an effective high speed data processing system employing clock pulse signals of the order of one millimicrosecond duration ($10^{-9}$ seconds) recurring at microwave frequency rates of approximately $10^9$ pulses per second, it is desirable to employ traveling-wave tubes as active circuit elements since amplifiers employing traveling-wave tubes are well-known for their ability to amplify microwave signals over a broad range of frequencies.

In any system processing data at a very rapid rate, especially one where traveling-wave tubes would be employed as the active circuit elements, signal amplitudes will vary over wide ranges throughout the system. In order to avoid employment of excessive numbers of traveling-wave tubes in the system, it is desirable that operations often be performed on signals without reconstruction or amplification thereof until they are attenuated to near the noise level. However, in a system that represents binary digital data in pulse no-pulse script, there is the constant danger that background noise in the presence of a low-level no-pulse digital representation will be mistaken for a pulse digital representation. Consequently, in a data processing system employing pulse no-pulse script, the lowest signal level must be held well above the noise level, and the minimum number of active circuit elements is unduly large for a given allowable error rate.

On the other hand, a data processing system employing binary digital representation, wherein the information content of a signal is not denoted by its amplitude, permits the use of fewer active circuit elements for a given error rate. Such a representation wherein there is no signal amplitude distinction for the two binary digits also permits the use of increased clock rates for a given noise level. A further advantage of a binary digital representation wherein there is no signal amplitude difference for the two binary digits as compared to the pulse no-pulse script is that signals may not have to be limited or suppressed at predetermined intervals in order to represent one of the binary digits. In many applications wherein the clock rate is in the microwave frequency range, it becomes extremely difficult to alternately permit and prohibit signal transmission; for example, to form an electron beam and then to suppress it in adjacent millimicrosecond intervals is a difficult technical problem in many electron tubes employed to operate with microwave frequencies. In these applications, technical difficulties may be avoided by allowing the signal to maintain constant amplitude and by employing other techniques to represent binary digital data. Additionally, in a data processing system wherein the two binary digital representations are maintained at constant amplitude, the amplitude limiting saturation effects of traveling-wave tubes provide an effective means to secure system amplitude control.

One type of binary representation that permits the utilization of a constant amplitude electrical signal is known as frequency script. In frequency script representation, both the binary "1" and the binary "0" are represented by alternating signals of substantially equal amplitude. However, each of these types of binary digits is denoted by a signal of a different frequency. The successive digits of a binary number therefore appear serially within a microwave signal of constant amplitude, the frequency of which changes to correspond to the the binary value of the information contained therein. Arithmetic and logical operations similar to those employed in computers using the pulse no-pulse script may be performed; however, the logical elements used in prior art pulse no-pulse script data processors are unsuitable for use in computers using frequency script.

Accordingly, it is the primary object of the present invention to provide logical elements for use in data processing systems utilizing frequency script.

It is a further object of the present invention to provide logical elements operative at microwave frequencies.

It is still another object of the present invention to provide logical elements for implementing the logical functions of AND and OR.

Further objects and advantages of the present invention will become apparent as the description thereof proceeds.

Briefly, in accordance with one embodiment of the present invention, a microwave logical element is provided for receiving two data signals. The data signals represent binary information in frequency script and may have one of two frequencies $F_1$ or $F_2$. One of the data signals is applied to two filters simultaneously, each adapted to pass a different one of the frequencies $F_1$ and $F_2$. The first of these two filters is adapted to pass signals of the first frequency $F_1$, and apply those signals to a delay element. The delay element is connected to an output terminal through a hybrid junction for providing the output terminal with signals of frequency $F_1$ after an appropriate delay. The second filter is adapted to pass signals of the other of the two frequencies, $F_2$, and apply the data signals of that frequency to a mixer which provides a third frequency $F_3$ equal to the sum of the frequencies $F_1$ and $F_2$. The third frequency $F_3$ is applied simultaneously to a second mixer, where it is combined with the second input data signal, and a third mixer, where it is combined with the output signal of the second mixer. The output signal of the third mixer is supplied to the output terminal of the logical element through the above mentioned hybrid junction. The signal present at the output terminal represents the logical combination of the two input data signals in frequency script.

The invention, both as to its organization and operation together with further objects and advantages thereof, may best be understood by reference to the following description taken in connection with the accompanying drawings in which:

FIG. 1 shows two wave forms illustrating binary information in frequency script.

FIG. 2 shows two truth tables describing the OR and AND functions for two binary data signals A and B in frequency script.

FIG. 2 shows a logical element constructed in accordance with the teachings of the present invention for implementing the logical function AND.

FIG. 4 shows a logical element constructed in accordance with the teachings of the present invention for implementing the logical function OR.

FIG. 5 is a table of frequency values of the electrical signals present at various points throughout the logical element of FIG. 3.

FIG. 6 is a table of frequency values of electrical signals present at various points throughout the logical element of FIG. 4.

Figure 4:
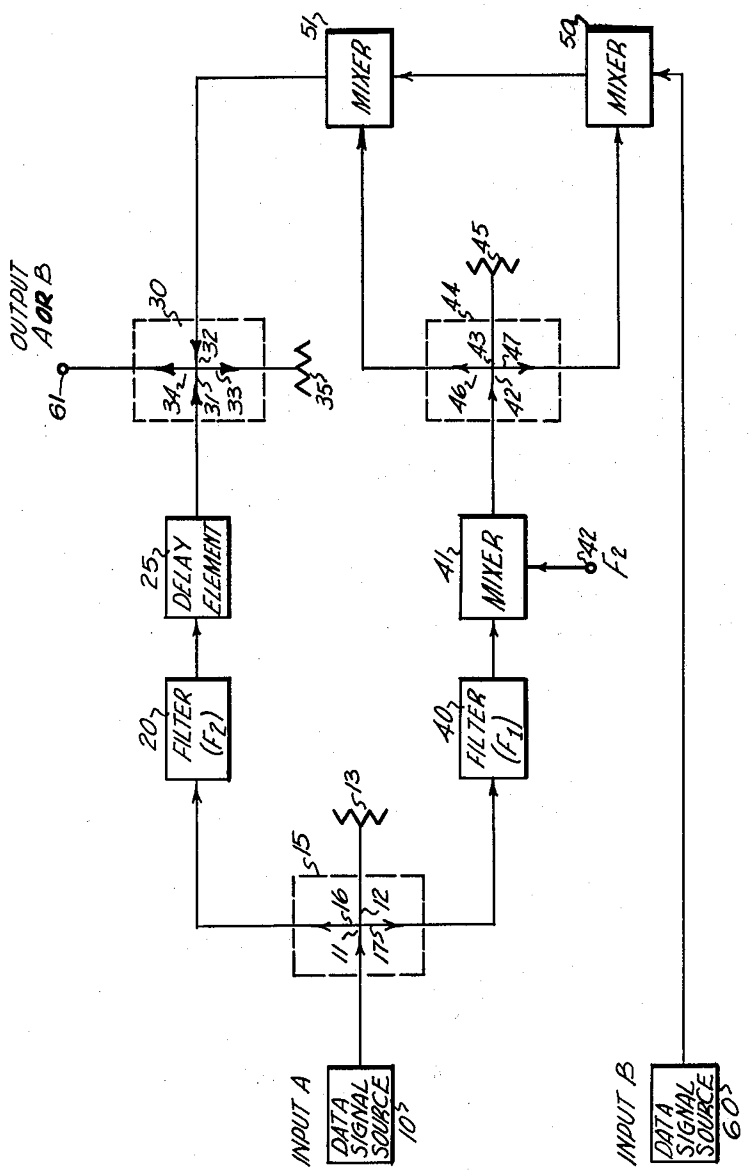

To facilitate the description of the present invention, a brief explanation of the utilization of frequency script for binary representation will now be given. Basically, frequency script is the utilization of a designated frequency for a given binary value. For example, a frequency $F_1$ of 2.8 kmc. (kilomegacycles) may be used to indicate a binary "0," and a second frequency $F_2$ of 6.0 kmc. may be used to indicate a binary "1." Referring to FIG. 1, wave form X indicates an electrical signal having a frequency $F_2$ indicative of a binary "1." Wave form Y indicates an electrical signal having a frequency $F_1$ indicative of a binary "0"; therefore, binary information contained in a signal in frequency script is determined by the frequency of the data signal. Since wave forms X and Y have the same amplitude, the problems connected with amplitude variations discussed previously are eliminated.

The AND and OR functions may be described with the aid of the truth tables of FIG. 2. Referring to FIG. 2, two data signals A and B are shown in the upper left block of each truth table. The top row of each truth table indicates the two binary values (1 and 0) that the data signal A may assume; the left column of each truth table of FIG. 4 indicates the two binary values that the data signal B may assume. Since a binary "1" is indicated in frequency script by a frequency of $F_2$, and a binary "0" is indicated in frequency script by a frequency of $F_1$, the binary values are indicated in the truth table of FIG. 2 by the respective values of the frequencies shown. The remaining blocks of the truth tables are located at the junctions of columns and rows corresponding to the various binary values of the data signals A and B. Referring to the truth table for the AND function, it may be seen that the AND function is a binary "1" ($F_2$) when, and only when, both data signals A and B are binary "1's" ($F_2$). Referring to the truth table representing the OR function, it may be seen that the OR function is a 1 ($F_2$) when either or both of the data signals A and B are a binary "1" ($F_2$).

The logical element of FIG. 3 is arranged to implement the AND function. A data signal source 10, for supplying a data signal A, is connected to one arm 11 of a conjugate pair of arms 11—12 of a hybrid junction 15. Basically, a hybrid junction is a high frequency junction having two pairs of conjugate arms and which, at microwave frequencies, may be considered an essentially lossless device formed by a metal enclosure at the junction of four transmission lines or wave guides. A typical hybrid junction employed in microwave systems comprises a combination of electrical field plane and magnetic field plane T junctions. This type of hybrid junction is commonly referred to as a magic T. Other types of hybrid junctions such as, for example, a hybrid ring using strip lines rather than rectangular waveguides, is equally suitable for use in the present invention. One of the properties of hybrid junctions is the ability to transmit a signal received in one arm of a conjugate pair of arms equally to the two arms of the other conjugate pair of arms. Conjugate arm 12 of the conjugate pair of arms 11—12 is suitably terminated by a dissipative member 13. Arm 16 of a conjugate pair of arms 16—17 is connected to a filter 20 which is adapted to pass electrical signals of frequency $F_1$ and to apply these signals to a delay element 25. The electrical signal from the delay element 25 is supplied to an output terminal 61 through arm 31 of conjugate pairs 31—32 and arm 34 of conjugate pair 33—34 of a hybrid junction 30.

Arm 17 of the conjugate pair 16—17 of hybrid junction 15 is connected to a second filter 40 adapted to pass electrical signals of frequency $F_2$ and to apply these signals to a mixer 41. Mixer 41 is provided with a continuous electrical signal of frequency $F_1$ applied to the mixer from terminal 42. The mixer 41 is designed to provide an output signal having a frequency equal to the sum of the applied frequencies. Thus, mixer 41 provides an output signal having a frequency equal to the sum of the frequencies $F_1$ and $F_2$.

Briefly, a mixer is a device wherein electrical signals of different frequencies may be combined to provide output signals having frequencies different than the input frequencies. A mixer of the type suitable for use in the present invention is shown in application Serial Number 832,629 by Max P. Forrer and Victor O. Met, filed August 10, 1959, now Patent No. 3,046,497, and assigned to the assignee of the present invention. Briefly, the mixer of that invention includes a pair of parallel coaxial transmission line sections adapted to receive two input signals and deliver these signals to a pair of crystal diodes, wherein the diodes provide the desired output frequency signal but no signal having a frequency equal to that of an input signal. A mixer constructed in accordance with the teachings of the above-mentioned invention permits the use of signals having frequencies which, when combined in the mixer, yield sum and difference side band frequencies in the same frequency range as the input signals. The output signal from mixer 41, the sum side band frequency $F_1+F_2$, is applied to arm 42 of a conjugate pair of arms 42—43 of a hybrid junction 44. The arm 43 is suitably terminated in dissipative member 45, and the signal from the mixer 41 is thus equally divided between conjugate arms 46 and 47. That portion of the signal following arm 47 is applied to a second mixer 50. That portion of the signal following arm 46 is applied to a third mixer 51.

A second data signal source 60 for providing a data signal B is connected to the mixer 50. Mixers 50 and 51 are adapted to provide output signals having a frequency equal to the difference between the frequencies of the signals applied to the mixer. Therefore, mixer 50 combines the data signal B with the signal received from arm 47 of hybrid junction 44 and provides an electrical signal having a frequency equal to the difference between the two applied frequencies. The output signal of mixer 50 is applied to the mixer 51 wherein it is combined with the signal from the arm 46 of hybrid junction 44 to provide a signal having a frequency equal to the difference between the frequencies of the two applied signals. The output signal from mixer 51 is supplied to the output terminal 61 through arm 32 of conjugate pair 31—32 and arm 34 of conjugate pair 34—35 of hybrid junction 30. The operation of the logical element of FIG. 3 may be described with the aid of the truth table for the AND function of FIG. 2. An inspection of the truth table for the AND function reveals the fact that when the data signal A is of frequency $F_1$ the output of the logical element is also a signal of frequency $F_1$ regardless of the frequency of the data signal B. When the data signal A is of frequency $F_2$, the output signal of the logical element for the AND function has the same frequency as the frequency of the data signal B. When the data signal A from the data signal source 10 is a frequency $F_1$, the signal thus applied to the arm 11 of the hybrid junction 15 is divided equally between conjugate arms 16 and 17. That portion of the signal following arm 17 is blocked by the filter 40; however, that portion of the signal following arm 16 is applied to filter 20 which permits the signal of frequency $F_1$ to pass to the delay element 25. The delay element 25 may be used to achieve equal signal delays from data signal sources 10 and 60 to the output terminal 61. After being delayed in the delay element 25, the signal passes through arms 31 and 34 of a hybrid junction 30 to the output terminal 61. The signal available at the output terminal 61 therefore has a frequency $F_1$, when data signal A has a frequency of $F_1$, regardless of the frequency of the data signal B.

When the data signal A is of frequency $F_2$, that portion following arm 16 is blocked by filter 20, whereas that portion of the signal following arm 17 of hybrid junction 15 is applied to filter 40 and passed to the mixer 41. The signal of frequency $F_2$ is mixed with a signal of frequency $F_1$, applied to terminal 42, within the mixer 41; the resulting signal has a frequency equal to the sum of the frequencies $F_1$ and $F_2$. The mixer 41 may be supplemented with a filter (not shown) designed to pass only the sum side band frequency $F_1+F_2$ of the mixer 41; however, if the mixer is of the type described in the previously mentioned application by Forrer and Met, the characteristics of the mixer may eliminate the necessity of the additional filter.

The signal having sum frequency $F_1+F_2$ is equally divided between conjugate arms 46 and 47 of hybrid junction 44. That portion of the signal following arm 47 is applied to mixer 50; that portion of the signal following arm 46 is applied to mixer 51. If the data signal B from the data signal source signal 60 is of frequency $F_2$, the mixer 50 combines this signal with the sum side band signal from mixer 41 and provides an output signal having a frequency equal to the difference of the two applied signals. Thus, the sum side band frequency, $F_1+F_2$, is combined with the data signal $B(F_2)$ to yield an output signal of frequency $F_1$ as follows:

$$(F_1+F_2)-F_2=F_1$$

The output signal of the mixer 50 is then applied to the mixer 51 where it is combined with the sum side band frequency $F_1+F_2$ from the mixer 41 as follows:

$$(F_1+F_2)-F_1=F_2$$

The output of mixer 51 is thus a signal having a frequency $F_2$ equal to the frequency of the data signal B. The output signal from the mixer 51 is applied to arm 32 of the hybrid junction 30 and supplied to the output terminal 61 through arm 34.

Now, assuming that the frequency of data signal A remains $F_2$, but that the frequency of data signal B is changed from $F_2$ to $F_1$, the output of mixer 50 will be $$(F_1+F_2)-F_1=F_2$$

and the output of mixer 51 will be $$(F_1+F_2)-F_2=F_1$$

Accordingly, the output signal available at terminal 61 will be of the same frequency as the data signal B when data signal A is of frequency $F_2$.

Therefore, whenever the data signal A is of frequency $F_1$, that signal is passed through filter 20 and delay element 25 to the output terminal 61; further, filter 40 blocks the data signal A to preclude the generation of the sum sideband frequency $F_2+F_2$ in mixer 41 and prevents data signal B from affecting the signal available at terminal 61. When the data signal A is of frequency $F_2$, filter 20 prevents that signal from reaching terminal 61, and filter 40 permits that signal to pass to the mixer 41 where it is mixed with frequency $F_1$ to provide a sum side band frequency $F_1+F_2$. The output signal available at terminal 61 will then be of the same frequency as the data signal B. It may therefore be seen that the signal available at terminal 61 satisfies the requirements of the truth table for the AND function of FIG. 2.

FIG. 5 is a table showing the frequencies of the electrical signals at various points throughout the logical element of FIG. 3 when the data signals A and B assume either of two frequencies $F_1$ or $F_2$. For purposes of illustration, the frequency $F_2$ (binary "0") is assumed to be 2.8 kmc.; similarly, frequency $F_2$ (binary "1") is assumed to be 6.0 kmc. The first two columns and the last column of FIG. 5 include numbers, indicating the frequency at the respective location in the logical element, followed by the binary value, in parenthesis, of the indicated frequency.

FIG. 4 shows a logical element constructed in accordance with the teachings of the present invention for implementing the logical function OR. Since the arrangement of the logical element of FIG. 4 is identical to the arrangement of the logical element of FIG. 3, the corresponding parts are numbered alike. To implement the logical function of OR, the filter 20 is designed to pass the frequency $F_2$ while blocking the frequency $F_1$; further, filter 40 is designed to pass the frequency $F_1$ and block the frequency $F_2$. A frequency $F_2$ is continuously applied to terminal 42 for utilization in the mixer 41 to combine with the frequency $F_1$ from filter 40 and provide a sum side band frequency $F_1+F_2$ to the mixers 50 and 51.

The operation of the logical element of FIG. 4 may be described in combination with the truth table for the OR function of FIG. 2. Referring to the truth table for the OR function of FIG. 2, it may be seen that when the data signal A is a frequency $F_2$, the resulting output signal is also a frequency $F_2$; when the data signal A is of frequency $F_1$, the frequency of the output signal always corresponds to the frequency of the data signal B. Accordingly, assuming that the data signal A is of frequency $F_1$, that portion of the signal following arm 16 of hybrid junction 15 is blocked by the filter 20; whereas that portion of the signal following arm 17 is passed by the filter 40 to the mixer 41 wherein it is mixed with the frequency $F_2$, applied to the terminal 42, to provide a sum side band frequency $F_1+F_2$. The signal having sum side band frequency is equally divided between conjugate arms 46 and 47 of hybrid junction 44 and applied to the mixers 50 and 51. The frequency of the data signal B will then determine the frequency of the signal available at the output terminal 61. For example, when the data signal B is of frequency $F_1$, the combination of that frequency with the sum side band frequency in mixer 50 yields $$(F_1+F_2)-F_1=F_2$$

which is combined in mixer 51 to yield $$(F_1+F_2)-F_2=F_1$$

Therefore, the frequency of the signal available at the terminal 61 is $F_1$. Similarly, if the data signal B is of frequency $F_2$, the frequency of the signal available at the output terminal 61 is also of frequency $F_2$. Therefore, the conditions of the truth table of FIG. 2 for the OR function are satisfied.

FIG. 6 is a table showing the frequencies of the electrical signals at various points throughout the logical element of FIG. 4 when the data signals A and B assume either of two frequencies $F_1$ or $F_2$. For purposes of illustration, the frequency $F_1$ (binary "0") is assumed to be 2.8 kmc.; similarly, frequency $F_2$ (binary "1") is assumed to be 6.0 kmc. The first two columns and the last column of FIG. 6 include numbers indicating the frequency at the respective location in the logical element, followed by the binary value, in parenthesis, of the indicated frequency.

The logical elements of FIGURES 3 and 4 may be expanded by well known principles to accommodate more than two data signals and implement the logical functions of AND and OR for three or more data signals.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by letters patent of the United States is:

1. A high frequency logical element comprising, a first and a second input terminal each for receiving electrical signals having one of frequencies $F_1$ and $F_2$, a first and a second filter connected to said first input terminal, each of said filters adapted to pass a different one of frequencies $F_1$ and $F_2$, means responsive to the signal received from one of said filters for producing a signal having a frequency $F_3$ equal to the sum of said frequencies $F_1$ and $F_2$, and signal producing means responsive to signals from said second input terminal and to said signal of frequency $F_3$ for producing a signal having one of frequencies $F_1$ and $F_2$.

2. A high frequency logical element comprising, a plurality of sources of electrical signals, each of said electrical signals having one of frequencies $F_1$ and $F_2$, a first and a second filter connected to one of said sources of electrical signals, each of said filters adapted to pass a different one of said frequencies, means responsive to the signal received from one of said filters, for producing a signal having a frequency $F_3$ equal to the sum of said frequencies $F_1$ and $F_2$, and signal producing means responsive to signals from another of said sources of electrical signals and to said signal of frequency $F_3$ for producing a signal having one of frequencies $F_1$ and $F_2$.

3. A high frequency logical element comprising, a plurality of sources of electrical signals, each of said electrical signals having one of frequencies $F_1$ and $F_2$, a first and a second filter connected to one of said sources of electrical signals, each of said filters adapted to pass a different one of said frequencies, means responsive to the signal received from one of said filters for producing a signal having a frequency $F_3$ equal to the sum of said frequencies $F_1$ and $F_2$, signal producing means responsive to signals from another of said sources of electrical signals and to said signal of frequency $F_3$ for producing a signal having one of frequencies $F_1$ and $F_2$, an output terminal, and means connecting said last mentioned signal producing means and the other of said filters to said output terminal.

4. A high frequency logical element comprising, a plurality of sources of electric signals, each of said electrical signals having one of frequencies $F_1$ and $F_2$, a first and a second filter connected to one of said sources of electrical signals, each of said filters adapted to pass a different one of said frequencies, a first means connected to one of said filters for producing an electrical signal having a frequency $F_3$ equal to the sum of said frequencies $F_1$ and $F_2$, a second means responsive to the signal from said first means and to signals from said second source of signals for producing signals having a frequency equal to the difference between $F_3$ and one of frequencies $F_2$ and $F_1$, and a third means responsive to the signals from said first and said second means for producing signals having one of frequencies $F_1$ and $F_2$.

5. A high frequency logical element comprising, a plurality of sources of electrical signals, each of said electrical signals having one of frequencies $F_1$ and $F_2$, a first and a second filter connected to one of said sources of electrical signals, each of said filters adapted to pass a different one of said frequencies, a first means connected to one of said filters for producing an electrical signal having a frequency $F_3$ equal to the sum of said frequencies $F_1$ and $F_2$, a second means responsive to the signal from said first means and to signals from said second source of signals for producing signals having a frequency equal to the difference between $F_3$ and one of frequencies $F_2$ and $F_1$, a third means responsive to the signals from said first and said second means for producing signals having one of frequencies $F_1$ and $F_2$, an output terminal, and means connecting said third means and the other of said filters to said output terminal.

6. A high frequency logical element comprising, a first and a second source of electrical signals, each of said signals having one of frequencies $F_1$ and $F_2$, a first and a second filter connected to said first source of electrical signals, each of said filters adapted to pass a different one of said frequencies, means responsive to the signal from one of said filters for producing a signal having a frequency $F_3$ equal to the sum of said frequencies $F_1$ and $F_2$, means responsive to signals from said second source of electrical signals and to said signal of frequency $F_3$ for producing a signal having one of frequencies $F_1$ and $F_2$.

7. A high frequency logical element comprising, a first and a second source of electrical signals, each of said signals having one of frequencies $F_1$ and $F_2$, a first and a second filter connected to said first source of electrical signals, each of said filters adapted to pass a different one of said frequencies, means responsive to the signal from one of said filters for producing a signal having a frequency $F_3$ equal to the sum of said frequencies $F_1$ and $F_2$, signal producing means responsive to signals from said second source of electrical signals and to said signal of frequency $F_3$ for producing a signal having one of frequencies $F_1$ and $F_2$, an output terminal, and means connecting said last mentioned signal producing means and the other of said filters to said output terminal.

8. A high frequency logical element comprising, a first and a second source of electrical signals, each of said electrical signals having one of frequencies $F_1$ and $F_2$, a first and a second filter connected to said first source of electrical signals, each of said filters adapted to pass a different one of said frequencies, a first means connected to one of said filters for producing an electrical signal having a frequency $F_3$ equal to the sum of said frequencies $F_1$ and $F_2$, and a second means responsive to the signal from said first means and to signals from said second source of signals for producing signals having frequency equal to the difference between $F_3$ and one of frequencies $F_1$ and $F_2$, a third means responsive to the signals from said first and said second means for producing signals having one of frequencies $F_1$ and $F_2$, an output terminal, and means connecting said third means and the other of said filters to said output terminal.

9. A high frequency logical element comprising, a first and a second source of electrical signals, each of said electrical signals having one of frequencies $F_1$ and $F_2$, a first and a second filter connected to said first source of electrical signals, each of said filters adapted to pass a different one of said frequencies, a first mixer connected to one of said filters for producing an electrical signal having a frequency $F_3$ equal to the sum of said frequencies $F_1$ and $F_2$, a second mixer responsive to the signal from said first mixer and to signals from said second source of signals for producing signals having a frequency equal to the difference between $F_3$ and one of frequencies $F_1$ and $F_2$, a third mixer responsive to the signals from said first and second mixers for producing signals having one of frequencies $F_1$ and $F_2$, an output terminal, and means connecting said third mixer and the other of said filters to said output terminal.

10. A high frequency logical element comprising, a first and a second source of electrical signals, each of said electrical signals having one of frequencies $F_1$ and $F_2$, a first and a second filter connected to said first source of electrical signals, each of said filters adapted to pass a different one of said frequencies, signal producing means responsive to the signal from one of said filters for producing a signal having a frequency $F_3$ equal to the sum of said frequencies $F_1$ and $F_2$, signal producing means responsive to signals from said second source of electrical signals and to said signals of frequency $F_3$ for producing a signal having one of frequencies $F_1$ and $F_2$, an output terminal, a delay element having a first and a second terminal, means connecting the other of said filters to the first terminal of said delay element, and means connecting said last mentioned signal producing means and the second terminal of said delay element to said output terminal.

11. A high frequency logical element comprising, a first and a second source of electrical signals, each of said electrical signals having one of frequencies $F_1$ and $F_2$, a first and a second filter connected to said first source of electrical signals, each of said filters adapted to pass a different one of said frequencies, a first mixer connected to one of said filters for producing an electrical signal having a frequency $F_3$ equal to the sum of said frequencies $F_1$ and $F_2$, a second mixer responsive to the signals from said first mixer and to signals from said second source of signals for producing signals having a frequency equal to the difference between the frequency $F_3$ and one of frequencies $F_1$ and $F_2$, a third mixer responsive to the signals from said first and second mixers for producing signals having one of frequencies $F_1$ and $F_2$, an output terminal, a delay element having a first and a second terminal, means connecting the other of said filters to the first terminal of said delay element, and means connecting said third mixer and the second terminal of said delay element to said output terminal.

12. A high frequency logical element comprising, a first and a second source of electrical signals, each of said electrical signals having one of frequencies $F_1$ and $F_2$, a first hybrid junction having two pairs of conjugate arms, means connecting said first source of electrical signals to one arm of the first conjugate pair of arms of said hybrid junction, a first and a second filter each connected to a different arm of the second conjugate pair of arms of said first hybrid junction, each of said filters adapted to pass a different one of said frequencies, a first mixer connected to one of said filters for producing an electrical signal having a frequency $F_3$ equal to the sum of said frequencies $F_1$ and $F_2$, a second hybrid junction having two pairs of conjugate arms, means connecting said first mixer to one arm of the first conjugate pair of arms of said second hybrid junction, a second and a third mixer each connected to a different arm of the second conjugate pair of arms of said second hybrid junction, said second mixer responsive to the signal from said first mixer and to signals from said second source of signals for producing signals having a frequency equal to the difference between frequency $F_3$ and one of frequencies $F_1$ and $F_2$, said third mixer responsive to the signals from said first and second mixers for producing signals having one of frequencies $F_1$ and $F_2$, a delay element having a first and a second terminal, means connecting the other of said filters to the first terminal of said delay element, a third hybrid junction having two pairs of conjugate arms, means connecting said third mixer and the second terminal of said delay element each to a different arm of the first pair of conjugate arms of said third hybrid junction, an output terminal, and means connecting said output terminal to one arm of the second pair of conjugate arms of said third hybrid junction.

References Cited in the file of this patent

UNITED STATES PATENTS 3,007,643 Tukey ---------------- Nov. 7, 1961

UNITED STATES PATENT OFFICE
CERTIFICATE OF CORRECTION

Patent No. 3,077,564 February 12, 1963

Max P. Forrer

It is hereby certified that error appears in the above numbered patent requiring correction and that the said Letters Patent should read as corrected below.

Column 8, line 41, after "$F_2$," insert -- and --; line 69, after "having" insert -- a --.

Signed and sealed this 12th day of November 1963.

SEAL)
Ittest:

ERNEST W. SWIDER

Ittesting Officer

EDWIN L. REYNOLDS

Acting Commissioner of Patents